US 8,762,955 B2

(12) United States Patent
Bates

(10) Patent No.: US 8,762,955 B2
(45) Date of Patent: *Jun. 24, 2014

(54) EVENT MANAGEMENT IN A NON-STOP DEBUGGING ENVIRONMENT

(71) Applicant: International Business Machines Corporation, Armonk, NY (US)

(72) Inventor: Cary L. Bates, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/674,165

(22) Filed: Nov. 12, 2012

(65) Prior Publication Data
US 2013/0074044 A1 Mar. 21, 2013

Related U.S. Application Data

(63) Continuation of application No. 13/028,269, filed on Feb. 16, 2011.

(51) Int. Cl.
G06F 9/44 (2006.01)
G06F 11/00 (2006.01)

(52) U.S. Cl.
USPC .............................................. 717/129; 714/34

(58) Field of Classification Search
USPC .......................................................... 717/129
See application file for complete search history.

(56) References Cited

U.S. PATENT DOCUMENTS

| 5,506,967 | A  | * | 4/1996 | Barajas et al. ................. 711/118 |
| 5,632,032 | A  | * | 5/1997 | Ault et al. ..................... 718/100 |
| 6,113,645 | A  | * | 9/2000 | Benitz et al. ..................... 703/22 |
| 6,378,124 | B1 | * | 4/2002 | Bates et al. .................... 717/129 |
| 6,915,513 | B2 | * | 7/2005 | Duesterwald et al. ........ 717/168 |
| 7,020,871 | B2 | * | 3/2006 | Bernstein et al. ............. 717/129 |
| 7,178,145 | B2 | * | 2/2007 | Bono ............................. 718/100 |
| 7,203,927 | B2 | * | 4/2007 | Al-Azzawe et al. .......... 717/124 |
| 7,774,787 | B2 |   | 8/2010 | Leino et al. |
| 7,779,390 | B1 |   | 8/2010 | Allavarpu et al. |
| 7,865,883 | B1 |   | 1/2011 | Sistare et al. |
| 7,992,133 | B1 | * | 8/2011 | Theroux et al. ............... 717/124 |
| 2002/0073401 | A1 |   | 6/2002 | Sangavarapu et al. |
| 2002/0124042 | A1 | * | 9/2002 | Melamed et al. ............. 709/102 |

(Continued)

OTHER PUBLICATIONS

Sidwell et al., "Non-Stop Multi-Threaded Debugging in GDB," Mentor Graphics, 2008, 12pg.*

(Continued)

Primary Examiner — Ryan Coyer
(74) Attorney, Agent, or Firm — Biggers Kennedy Lenart Spraggins LLP; James R. Nock

(57) ABSTRACT

Event management in a non-stop debugging environment that includes a debugger configured to debug a debuggee, the debuggee including a number of threads of execution, where encountering an event by one of threads stops execution of only the one thread without concurrently stopping execution of other threads and event management includes: encountering, by a first thread, an event that stops execution of the first thread; while execution of the first thread is stopped, encountering, by each of one or more other threads, an event stopping execution of the other thread; queuing, by the debugger, the events stopping execution of the other threads; receiving, by the debugger from a user, an indication to flush one or more events from the queue; and flushing, by the debugger, the one or more events from the queue.

4 Claims, 7 Drawing Sheets

(56) References Cited

U.S. PATENT DOCUMENTS

| | | | |
|---|---|---|---|
| 2003/0009745 A1 | 1/2003 | Bates et al. | |
| 2003/0028862 A1 | 2/2003 | Bates et al. | |
| 2003/0131284 A1 | 7/2003 | Flanagan et al. | |
| 2005/0010678 A1* | 1/2005 | Pugh et al. | 709/232 |
| 2005/0235264 A1* | 10/2005 | Hines | 717/124 |
| 2005/0246691 A1* | 11/2005 | Hsieh et al. | 717/129 |
| 2006/0143531 A1* | 6/2006 | Kilian et al. | 714/38 |
| 2007/0260929 A1* | 11/2007 | Liu et al. | 714/38 |
| 2007/0288939 A1 | 12/2007 | Stall | |
| 2008/0133977 A1* | 6/2008 | Chun et al. | 714/38 |
| 2008/0134149 A1 | 6/2008 | Bates et al. | |
| 2009/0164976 A1 | 6/2009 | Gritter et al. | |
| 2009/0320001 A1 | 12/2009 | Bates et al. | |
| 2009/0327429 A1 | 12/2009 | Hughes et al. | |
| 2010/0064283 A1* | 3/2010 | Pett | 717/129 |
| 2010/0205377 A1* | 8/2010 | Moyer | 711/146 |
| 2010/0242026 A1 | 9/2010 | Bates et al. | |
| 2012/0198002 A1 | 8/2012 | Goulart et al. | |
| 2012/0210305 A1 | 8/2012 | Bates | |
| 2012/0222008 A1 | 8/2012 | Bates | |
| 2012/0266134 A1 | 10/2012 | Bates | |
| 2012/0266138 A1 | 10/2012 | Bates | |
| 2012/0266139 A1 | 10/2012 | Bates | |
| 2012/0266140 A1 | 10/2012 | Bates | |
| 2013/0067438 A1 | 3/2013 | Bates | |
| 2013/0074041 A1 | 3/2013 | Bates | |
| 2013/0097589 A1 | 4/2013 | Bates | |
| 2013/0097590 A1 | 4/2013 | Bates | |
| 2013/0097591 A1 | 4/2013 | Bates | |

OTHER PUBLICATIONS

Sidwell, et al., "Non-Stop Multi-Threaded Debugging in GDB", GCC Developers' Summit 2008, CodeSourcery Inc., Ottawa, Canada.

Mark, D., et al., "Debugging" Chapter From, "More iPhone 3 Development, Tackling iPhone SDK 3," 2009, pp. 495-526, Apress. Online ISBN: 978-1-4302-2506-5.

Roberts, P., "Implementation and Evaluation of Data Breakpoint Schemes in an Interactive Debugger," Master's Thesis, Jun./Dec. 1996, pp. 1-96, Department of Computer Science, University of Utah. URL: http://www.google.com/url?sa=t&rct=j&q=&esrc=s&source=web&cd=2&ved=0CDwQFjAB&url=http%3A%2F%2Fciteseerx.ist.psu.edu%2Fviewdoc%2Fdownload%3Fdoi%3D10.1.1.44.7562%26rep%3Drep1%26type%3Dpdf&ei=szJjUaOiHonn2AWI-4GQBA&usg=AFQjCNHZQ_R-GOciQPzkpe8xT0vf7lyjxw&sig2=Tu8PX61jYYGiTmrE8Qju_w.

Harrow, Jr., J., "Runtime Checking of Multithreaded Applications with Visual Threads," K. Havelund, J. Penix, and W. Visser (Eds.): SPIN 2000, LNCS 1885, 2000, pp. 331-342, Springer-Verlag Berlin Heidelberg. URL: ftp://159.226.92.10/pub/netlib/spin/ws00/18850335.pdf.

Office Action, U.S. Appl. No. 13/028,269, Apr. 3, 2013, pp. 1-36.
Office Action, U.S. Appl. No. 13/674,165, Apr. 2, 2013, pp. 1-29.
Office Action, U.S. Appl. No. 13/033,925, Apr. 1, 2013, pp. 1-20.
Office Action, U.S. Appl. No. 13/674,235, Mar. 28, 2013, pp. 1-13.
Office Action, U.S. Appl. No. 13/085,725, Mar. 28, 2013, pp. 1-53.
Office Action, U.S. Appl. No. 13/674,397, Apr. 1, 2013, pp. 1-42.
Office Action, U.S. Appl. No. 13/085,628, Jun. 12, 2013.
Office Action, U.S. Appl. No. 13/692,065, Jun. 14, 2013.
Office Action, U.S. Appl. No. 13/693,235, Aug. 29, 2013.
Office Action, U.S. Appl. No. 13/693,802, Jun. 7, 2013.
Final Office Action, U.S. Appl. No. 13/085,725, Oct. 2, 2013.
Final Office Action, U.S. Appl. No. 13/028,269, Oct. 7, 2013.
Final Office Action, U.S. Appl. No. 13/033,925, Oct. 4, 2013.
Final Office Action, U.S. Appl. No. 13/674,235, Oct. 3, 2013.
Final Office Action, U.S. Appl. No. 13/674,397, Oct. 3, 2013.
Final Office Action, U.S. Appl. No. 13/085,467, Oct. 10, 2013.
Final Office Action, U.S. Appl. No. 13/085,628, Oct. 10, 2013.
Notice of Allowance, U.S. Appl. No. 13/086,073, Oct. 10, 2013.
Final Office Action, U.S. Appl. No. 13/692,065, Oct. 10, 2013.
Final Office Action, U.S. Appl. No. 13/693,802, Oct. 11, 2013.

* cited by examiner

EVENT MANAGEMENT IN A NON-STOP DEBUGGING ENVIRONMENT

CROSS-REFERENCE TO RELATED APPLICATION

This application is a continuation application of and claims priority from U.S. patent application Ser. No. 13/028,269, filed on Feb. 16, 2011.

BACKGROUND OF THE INVENTION

1. Field of the Invention

The field of the invention is data processing, or, more specifically, methods, apparatus, and products for event management in a non-stop debugging environment.

2. Description of Related Art

Software source code is increasingly complex and execution of such software may be multi-threaded. Software development is evolving to provide enhanced methods of debugging multi-threaded software applications. In traditional debugging, an event encountered by any one thread stops execution of all threads of the multi-threaded solution. This form of debugging may be referred to as 'all-stop' debugging. in contrast to all-stop debugging, the enhanced multi-threaded debugging enables an event encountered by one thread to stop only that one thread's execution while all other threads remain executing. This form of debugging is referred to as non-stop debugging. Non-stop debugging is a bit of a misnomer, however, in that some threads actually do stop execution. The primary difference between non-stop and all stop debugging, is that in non-stop debugging execution of all threads of a multi-threaded program need not be stopped upon a single thread encountering an event, while in all-stop debugging execution of all threads is stopped upon a single thread of the multi-threaded application encountering an event. While non-stop debugging provides many benefits, non-stop debugging also presents many challenges.

SUMMARY OF THE INVENTION

Methods, apparatus, and products for event management in a non-stop debugging environment are disclosed. The non-stop debugging environment includes a debugger configured to debug a debuggee. The debuggee includes a plurality of threads of execution and, in the non-stop debugging environment, encountering an event by one of threads stops execution of only the one thread without concurrently stopping execution of other threads. In such a non-stop debugging environment, event management includes: encountering, by a first thread, an event that stops execution of the first thread; while execution of the first thread is stopped, encountering, by each of one or more other threads, an event stopping execution of the other thread; queuing, by the debugger, the events stopping execution of the other threads; receiving, by the debugger from a user, an indication to flush one or more events from the queue; and flushing, by the debugger, the one or more events from the queue.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION OF EXEMPLARY EMBODIMENTS

Figure 1:
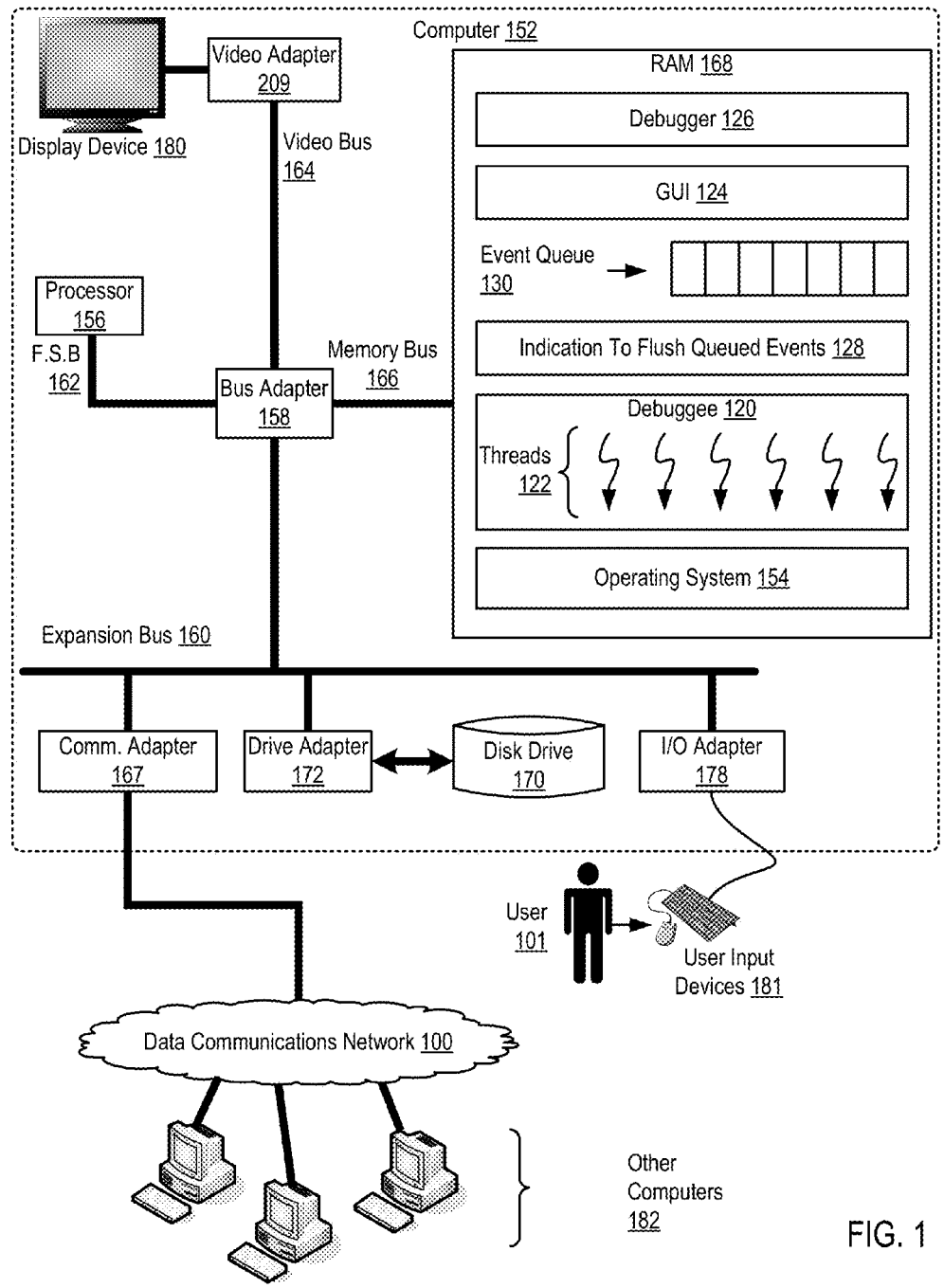
FIG. 1 sets forth a block diagram of a system for event management in a non-stop debugging environment according to embodiments of the present invention.

Exemplary methods, apparatus, and products for event management in a non-stop debugging environment in accordance with the present invention are described with reference to the accompanying drawings, beginning with FIG. 1. FIG. 1 sets forth a block diagram of a system for event management in a non-stop debugging environment according to embodiments of the present invention. The system of FIG. 1 includes automated computing machinery comprising an exemplary computer (152) useful in event management in a non-stop debugging environment according to embodiments of the present invention. The computer (152) of FIG. 1 includes at least one computer processor (156) or 'CPU' as well as random access memory (168) ('RAM') which is connected through a high speed memory bus (166) and bus adapter (158) to processor (156) and to other components of the computer (152).

Stored in RAM (168) are a debugger (126) and a debuggee (120). A debugger (126) is an application that controls operation of another application—the debuggee (120)—for the purpose of testing execution of the debuggee. The source code of the debuggee may run on an instruction set simulator (ISS), a technique that allows great power in its ability to halt when specific conditions are encountered but which will typically be somewhat slower than executing the code directly on a processor for which the code is written. When execution of a program crashes or reaches a preset condition, a debugger typically displays the position in the source code at which the execution of the program crashed. A 'crash' occurs when the program cannot normally continue because of a programming bug. In addition to displaying a position in source code when execution of the source code crashes, debuggers also often offer other functions such as running a program step by step (single-stepping or program animation), stopping, breaking, or pausing the program to examine the current state, at some event or specified instruction by means of a breakpoint, and tracking the values of some variables.

In the example system of FIG. 1, the debugger (126) presents a graphical user interface (124) as a front-end of the debugger (126). Front-ends are extensions to debugger engines that provide Integrated Development Environment ('IDE') integration, program animation, and visualization features, rather than console-based command line interfaces. The 'front-end' directly faces a client—or user—in contrast to the debugger (126) in the example of FIG. 1, which interfaces indirectly with the clients through the GUI (126).

In the example system of FIG. 1, the debuggee (120) is a software application that executes as a process containing a number of threads (122) of execution. A 'thread' of execution as the term is used here refers to the smallest unit of processing that can be scheduled by an operating system. A thread generally results from a fork of a computer program into two or more concurrently running threads. The implementation of threads and processes differs from one operating system to another, but in most cases, a thread is contained inside a process. Multiple threads can exist within the same process and share resources such as memory, while different processes do not share these resources. In particular, the threads of a process share the process's computer program instructions and its context—the values that the process's variables reference at any given moment.

The system of FIG. 1 includes a non-stop debugging environment that includes the debugger (126) and the debuggee (120). The debugger supports non-stop debugging by insuring that when one thread of a multi-threaded debuggee encounters an event, execution of only that one of threads stops, without concurrently stopping execution of other threads. Consider, for example, a multi-threaded debuggee that includes three threads. In a non-stop debug environment, when one of the threads encounters an event, execution of that thread is stopped, but execution of the remaining two threads continues unabated. Either of other two threads may then separately encounter an event, stopping execution of that thread, but no other thread. By contrast, a traditional all-stop debugging environment insures that all threads are stopped concurrently with any one thread encountering an event. Continuing with the above example of a triple threaded debuggee, when any one of the three threads encounters an event in a traditional all-stop debug environment, all three threads halt execution.

An event is a predefined occurrence during execution of a debuggee. Examples of events which may be encountered during execution of the debuggee include breakpoints, watchpoints, catchpoints, and the like. A breakpoint is a specification of a source code location at which a debuggee will pause or stop execution. A watchpoint is a breakpoint configured to pause or stop execution of the debuggee when a value of a particular expression changes. A catchpoint is another type of breakpoint configured to pause or stop execution of the debuggee when a specified event occurs such as the throwing of an exception or a load of a library, and so on.

In addition to supporting non-stop debugging, the debugger (126) in the example of FIG. 1 is also configured for event management in the non-stop debugging environment in accordance with embodiments of the present invention. Event management in accordance with embodiments of the present invention includes encountering, by a first thread of the multi-threaded debuggee (120), an event that stops execution of the first thread and, while execution of the first thread is stopped, encountering, by each of one or more other threads, an event stopping execution of the other thread. The debugger (126) in the example of FIG. 1 is configured to queue the events stopping execution of the other threads, receive, from a user (101), an indication (128) to flush one or more events from the queue, and flush the one or more events from the queue (130).

Also stored in RAM (168) is an operating system (154). Operating systems useful in computers that carry out event management in a non-stop debugging environment according to embodiments of the present invention include UNIX™, Linux™, Microsoft XP™, AIX™, IBM's i™, and others as will occur to those of skill in the art. The operating system (154), debugger (126), debuggee (126), and GUI (124) in the example of FIG. 1 are shown in RAM (168), but many components of such software typically are stored in non-volatile memory also, such as, for example, on a disk drive (170).

The computer (152) of FIG. 1 includes disk drive adapter (172) coupled through expansion bus (160) and bus adapter (158) to processor (156) and other components of the computer (152). Disk drive adapter (172) connects non-volatile data storage to the computer (152) in the form of disk drive (170). Disk drive adapters useful in computers for event management in a non-stop debugging environment according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example computer (152) of FIG. 1 includes one or more input/output ('I/O') adapters (178). I/O adapters implement user-oriented input/output through, for example, software drivers and computer hardware for controlling output to display devices such as computer display screens, as well as user (101) input from user input devices (181) such as keyboards and mice. The example computer (152) of FIG. 1 includes a video adapter (209), which is an example of an I/O adapter specially designed for graphic output to a display device (180) such as a display screen or computer monitor. Video adapter (209) is connected to processor (156) through a high speed video bus (164), bus adapter (158), and the front side bus (162), which is also a high speed bus.

The exemplary computer (152) of FIG. 1 includes a communications adapter (167) for data communications with other computers (182) and for data communications with a data communications network (100). Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful for event management in a non-stop debugging environment according to embodiments of the present invention include modems for wired dial-up communications, Ethernet (IEEE 802.3) adapters for wired data communications network communications, and 802.11 adapters for wireless data communications network communications.

The arrangement of computers, networks, and other devices making up the exemplary system illustrated in FIG. 1 are for explanation, not for limitation. Data processing systems useful according to various embodiments of the present invention may include additional servers, routers, other devices, and peer-to-peer architectures, not shown in FIG. 1, as will occur to those of skill in the art. Networks in such data processing systems may support many data communications protocols, including for example TCP (Transmission Control Protocol), IP (Internet Protocol), HTTP (HyperText Transfer Protocol), WAP (Wireless Access Protocol), HDTP (Handheld Device Transport Protocol), and others as will occur to those of skill in the art. Various embodiments of the present invention may be implemented on a variety of hardware platforms in addition to those illustrated in FIG. 1.

Figure 2:
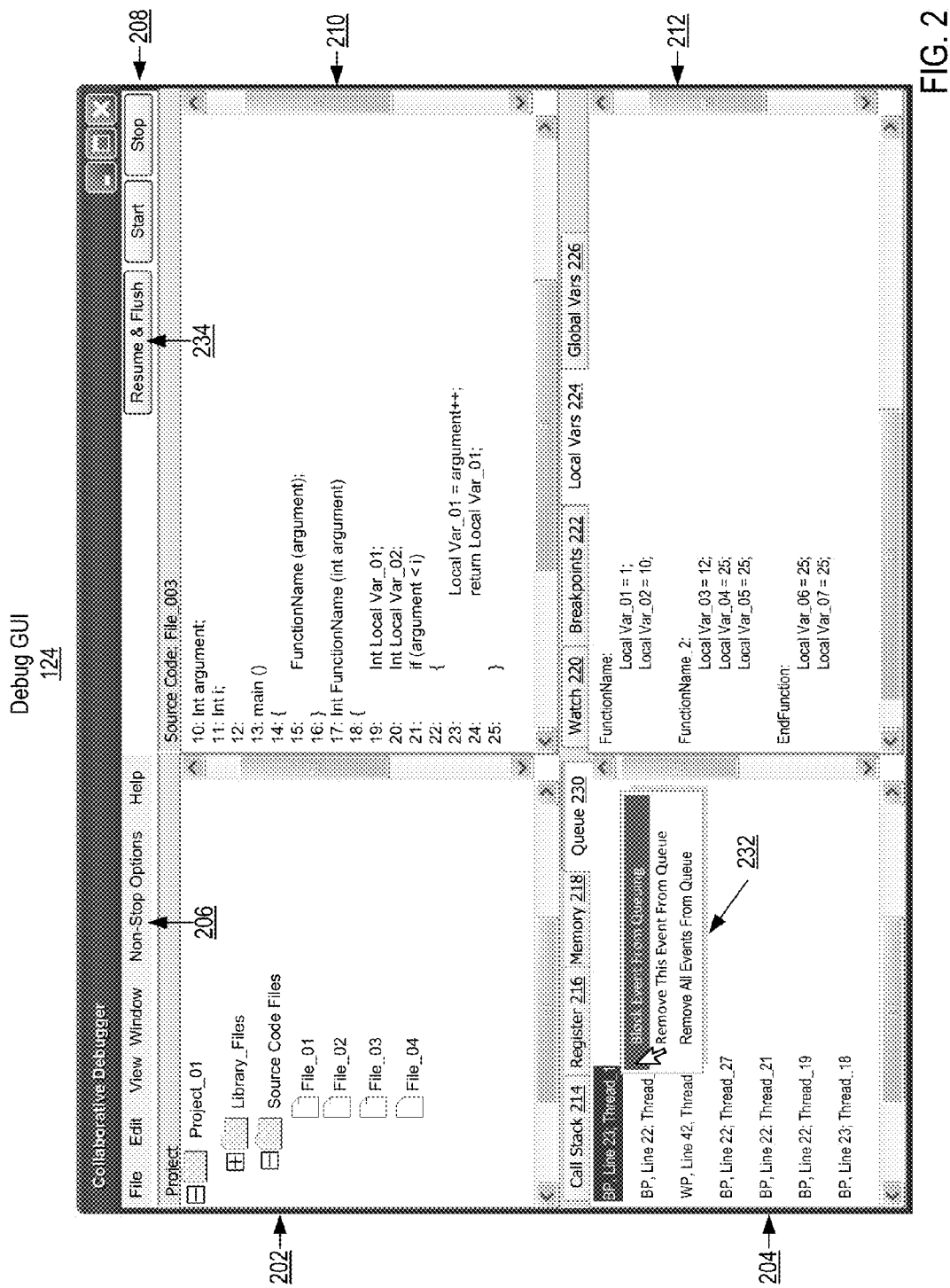
FIG. 2 sets forth an example non-stop debugging GIU presented to a user in accordance with embodiments of the present invention.

For further explanation, FIG. 2 sets forth an example non-stop debugging GIU (124) presented to a user in accordance with embodiments of the present invention. The example GUI (124) of FIG. 2 provides an interface for a user to control operation of a debugger that supports non-stop debugging. The debugger presenting the example GUI (124) of FIG. 2 is configured to debug a multi-threaded debuggee. That is, the debugger presenting the example GUI (124) of FIG. 2 and the multi-threaded debuggee form a non-stop debugging environment.

The example GUI (124) of FIG. 2 includes a menu bar (208) that, in turn, includes a number of separate menus: a File menu, an Edit menu, a View menu, a Non-Stop Options menu, and a Help menu. The Non-Stop Options menu (206), when selected, may provide a user with various menu items that support non-stop debugging.

The example GUI (124) of FIG. 2 also includes several independent portions—called panes (as in 'window panes') for clarity of explanation—a project pane (202), a source code pane (210), and two separate data panes (204, 212). Project pane (202) presents the files and resources available in a particular software development project. Source code pane (210) presents the source code of the multi-threaded debuggee. The data panes (204, 212) present various data useful in debugging the source code.

In the example of FIG. 2, data pane (204) includes four tabs, each of which presents different data: a call stack tab (214), a register tab (214), a memory tab (218), and an event queue (230) tab. Data pane (212) includes four tabs: a watch list tab (220), a breakpoints (222) tab, a local variable tab (224), and a global variable tab (226).

The GUI (124) of FIG. 2 may support even management in accordance with embodiments of the present invention. As threads of the debuggee execute under control of the debuggee presenting the GUI (124) of FIG. 2, a first thread encounters an event that stops execution of the first thread. Being a non-stop debugging environment, all other threads of the multi-threaded debuggee continue to execute. Then, while execution of the first thread is stopped, one or more of the other threads of the multi-threaded debuggee encounters an event stopping execution of the other thread. The debugger presenting the example GUI (124) of FIG. 2 may then queue the events stopping execution of the other threads. Such events are presented in the example GUI (124) of FIG. 2 in the event queue (230) tab of the data pane (204). The queue in the example of FIG. 2 depicts seven events that are encountered, each by a separate thread, after the first thread encountered an event and stopped execution. In the example GUI (124) of FIG. 2, several breakpoints ('BP') and a watchpoint ('WP') are encountered by separate threads.

A GUI configured to support event management in a non-stop debugging environment in accordance with embodiments of the present invention may also provide various means by which a user may provide the debugger an indication to flush one or more events from the queue. The example GUI (124) depicts several different means. The GUI (124) presents, for example, a pop-up selection list (232) to a user in the data pane (232), upon a user's selection of a particular event in the queue (230) tab. The pop-up selection list (232) includes an option to remove the selected list from the queue or remove all events from the queue. The GUI (124), as another example, presents a GUI button (234) that when invoked by a user causes the debugger to flush the entire queue and resume execution of the first thread, and in some embodiments the other threads.

In some embodiments, the debugger is configured to block events from subsequently entering the queue. As such, the GUI (124) in the example of FIG. 2 provides to the user in the pop-up selection list (232) an option to block a particular event from queuing. Blocking an event from subsequently entering the queue is described in greater detail below.

The GUI items, menus, window panes, tabs, and so on depicted in the example client-specific GUI (124) of FIG. 2, are for explanation, not for limitation. Other GUI items, menu bar menus, drop-down menus, list-boxes, window panes, tabs, and so on as will occur to readers of skill in the art may be included in client-specific GUIs presented by debug clients in a distributed system in which collaborative software debugging is carried out in accordance with embodiments of the present invention.

Figure 3:
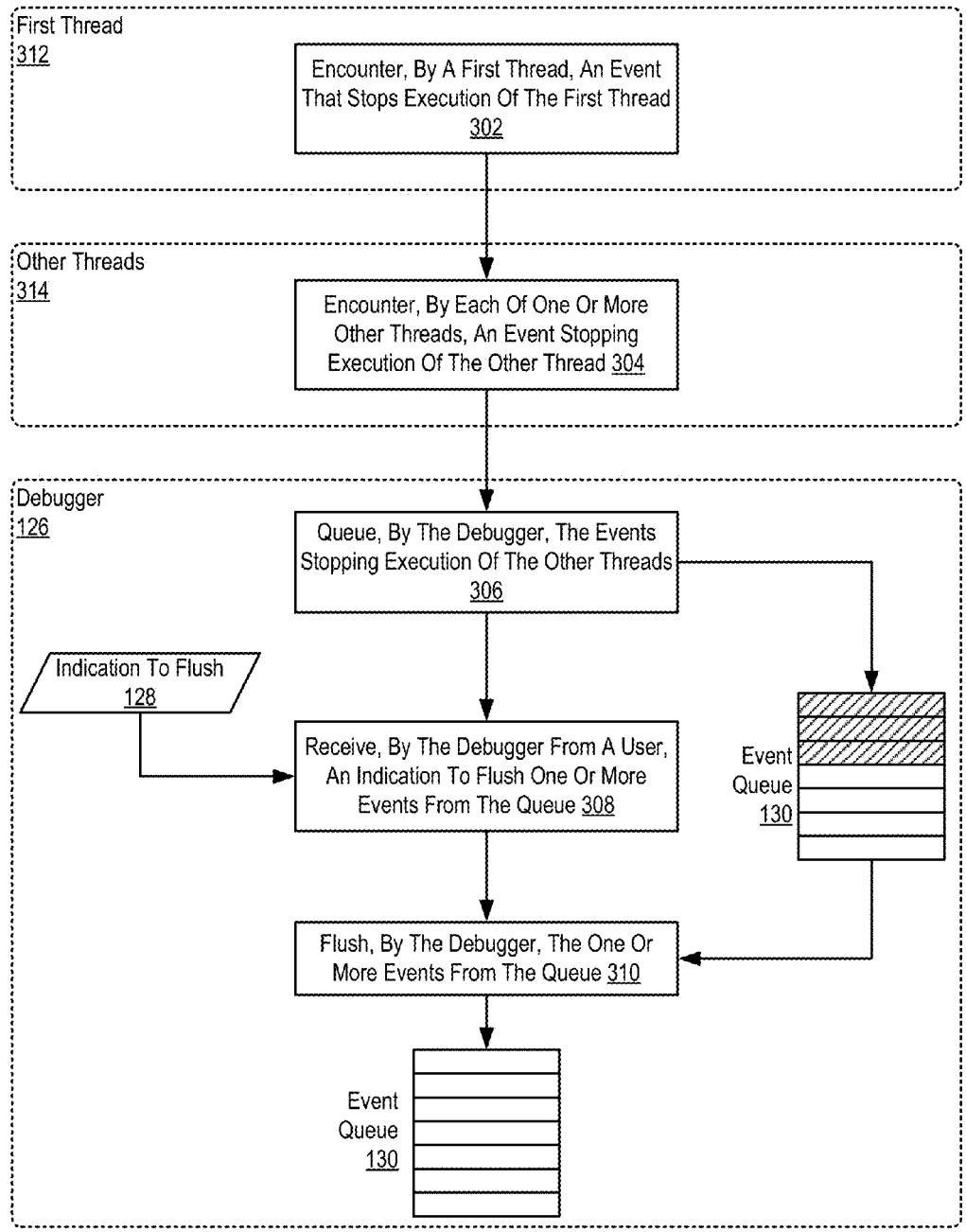
FIG. 3 sets forth a flow chart illustrating an exemplary method for event management in a non-stop debugging environment according to embodiments of the present invention.

For further explanation, FIG. 3 sets forth a flow chart illustrating an exemplary method for event management in a non-stop debugging environment according to embodiments of the present invention. The non-stop debugging environment of FIG. 3 includes a debugger (126) configured to debug a multi-threaded debuggee. In the non-stop debugging environment, encountering an event by one of threads stops execution of only the one thread without concurrently stopping execution of other threads.

The method of FIG. 3 includes encountering (302), by a first thread (312), an event that stops execution of the first thread. Encountering (302) an event may including encountering a breakpoint, a watchpoint, catchpoint, or other event.

While execution of the first thread is stopped, the method of FIG. 3 continues by encountering, by each of one or more other threads (314), an event stopping execution of the other thread. The 'one or more other threads' may include any number of threads, each of which encounters an event. The event encountered by each of the other threads may be the same event or a different. Further, any of the other threads may encounter the same event encountered by the first thread.

Consider, for example, that the first thread (312) encounters a breakpoint at line 11, stopping execution of the first thread. Later, prior to the first thread resuming execution, a second thread encounters a breakpoint that stops its execution. The breakpoint encountered by the second thread may be the breakpoint at line 11 encountered by the first thread or may be a different event, such as a breakpoint at line 42.

The method of FIG. 3 continues by queuing (306), by the debugger (126), the events stopping execution of the other threads. Queuing (306) the events stopping execution of the other threads may be carried out in various ways including, for example, storing in an event queue (130), an event descriptor that includes a thread identifier of the thread encountering the event and an event identifier of the event encountered by the thread.

The queue may be used by the debugger to process subsequently encountered events. The debugger, upon resuming execution of the first thread, may begin processing the next event in the event queue (130). That is, the event queue presents events to be processed in an iterative fashion. When processing an event, the debugger typically changes perspective presented in the GUI from information describing the first thread to information describing the thread that encountered the event now being processed. In this way, multiple events in the queue may cause a very disruptive debugging environment—immediately changing perspective to another thread upon resuming execution. Consider, for example, that a first thread encounters a breakpoint at line 11, stopping the first thread's execution. Then, while the first thread is not executing, ten other threads encounter the same breakpoint. In a typical non-stop debugging environment, upon resuming the first thread a perspective change occurs immediately, informing the user of the next queued event and thread encountering the event. In this typical environment, a change in perspective will occur once for each event in the queue immediately upon resuming one of the stopped threads.

To address this issue, among others, the method of FIG. 3 also includes receiving (308), by the debugger (125) from a user (101 on FIG. 1), an indication (128) to flush one or more events from the queue (130). Receiving (308) an indication (128) to flush one or more events from the queue (130) may be carried out by receiving the indication through a GUI presented to the user.

The method of FIG. 3 also includes flushing (310), by the debugger, the one or more events from the queue. Flushing an event from the event queue (130) may be carried out in various ways including removing from the queue a descriptor of the events being flushed. As events may be flushed from the queue, the disruptive nature of debugging caused by iterative processing of queued events (130) may be reduced.

Figure 4:
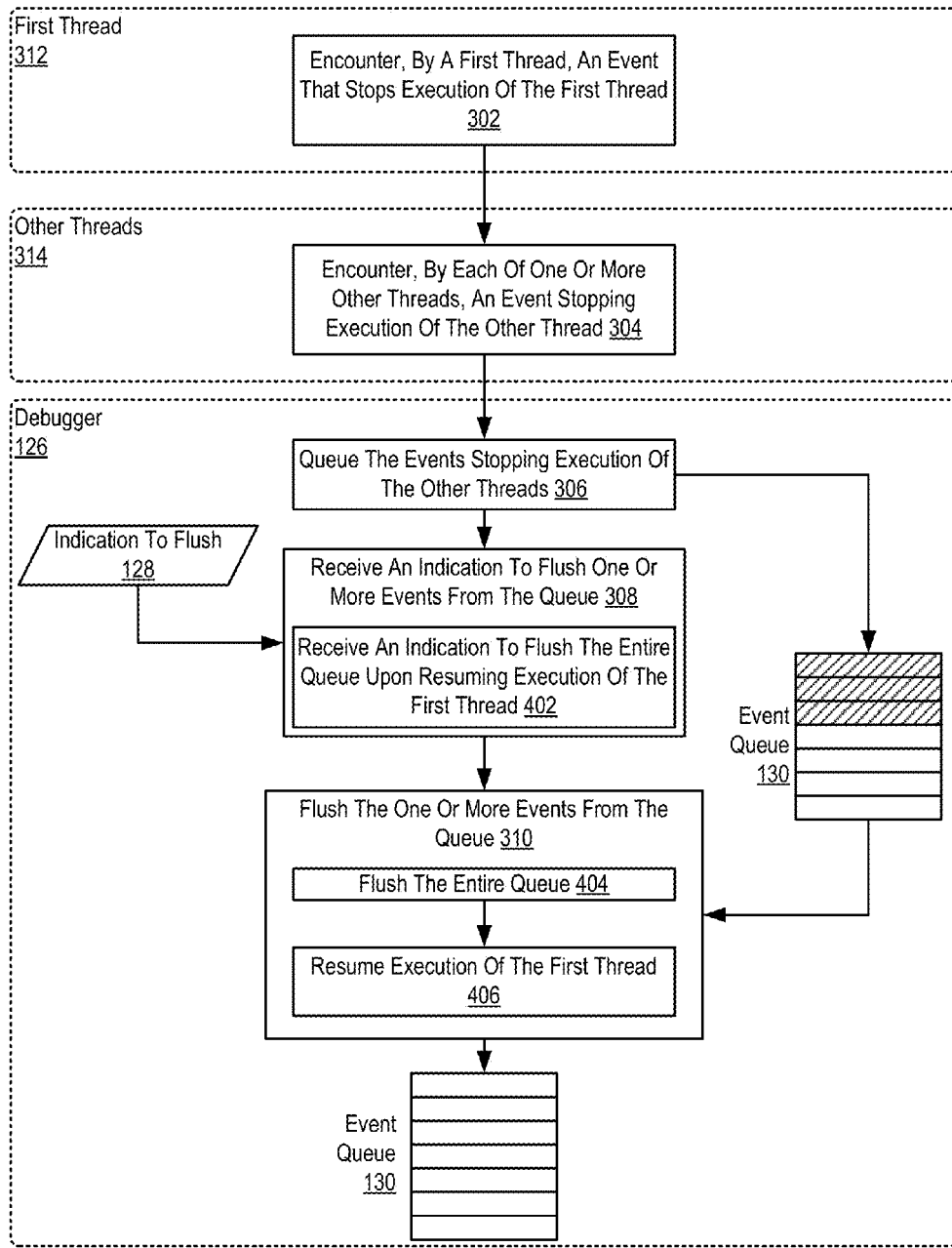
FIG. 4 sets forth a flow chart illustrating a further exemplary method for event management in a non-stop debugging environment according to embodiments of the present invention.

For further explanation, FIG. 4 sets forth a flow chart illustrating a further exemplary method for event management in a non-stop debugging environment according to embodiments of the present invention. The method of FIG. 4 is similar to the method of FIG. 3 in that the non-stop debugging environment of the method of FIG. 4 also includes a debugger (126) configured to debug a multi-threaded debuggee, where encountering an event by one of threads stops execution of only the one thread without concurrently stopping execution of other threads. The method of FIG. 4 is also similar to the method of FIG. 3 in that the method of FIG. 4 also includes: encountering (302), by a first thread (312), an event that stops execution of the first thread; while execution of the first thread (312) is stopped, encountering (304), by each of one or more other threads, an event stopping execution of the other thread; queuing (306), by the debugger (126), the events stopping execution of the other threads; receiving (308), by the debugger (126) from a user, an indication to flush one or more events from the queue (130); and flushing (310), by the debugger (126), the one or more events from the queue (130).

The method of FIG. 4 differs from the method of FIG. 3, however, in that in the method of FIG. 4, receiving (308) an indication to flush one or more events from the queue is carried out by receiving (402) an indication to flush the entire queue upon resuming execution of the first thread (312) and flushing (310) the one or more events from the queue is carried out by flushing (404) the entire queue and resuming (406) execution of the first thread (312).

Receiving (402) an indication to flush the entire queue upon resuming execution of the first thread (312) may be carried out in various ways including, for example, receiving the indication upon a user's invocation of a GUI button or other object designated for such purpose. Consider, for example, the GUI (124) presented in FIG. 2 that includes a GUI button (234) to "Resume & Flush." Such a button may be configured as an indication to the debugger (126) to flush the queue (130) of all queued events and continue executing the first thread (312). Additionally, such a button may also be configured to indicate a flush of the queue (130) along with the resumption of all stopped threads. In this way, with a single mouse-click, keyboard keystroke, or keystroke combination, a user may invoke two separate actions—resuming execution of at least the first thread and flushing all events from the queue. Effectively, this type of event flush indication enables a user to resume debugging with no changes in perspective to any other threads until a thread subsequently encounters another event after the flush of the queue.

Figure 5:
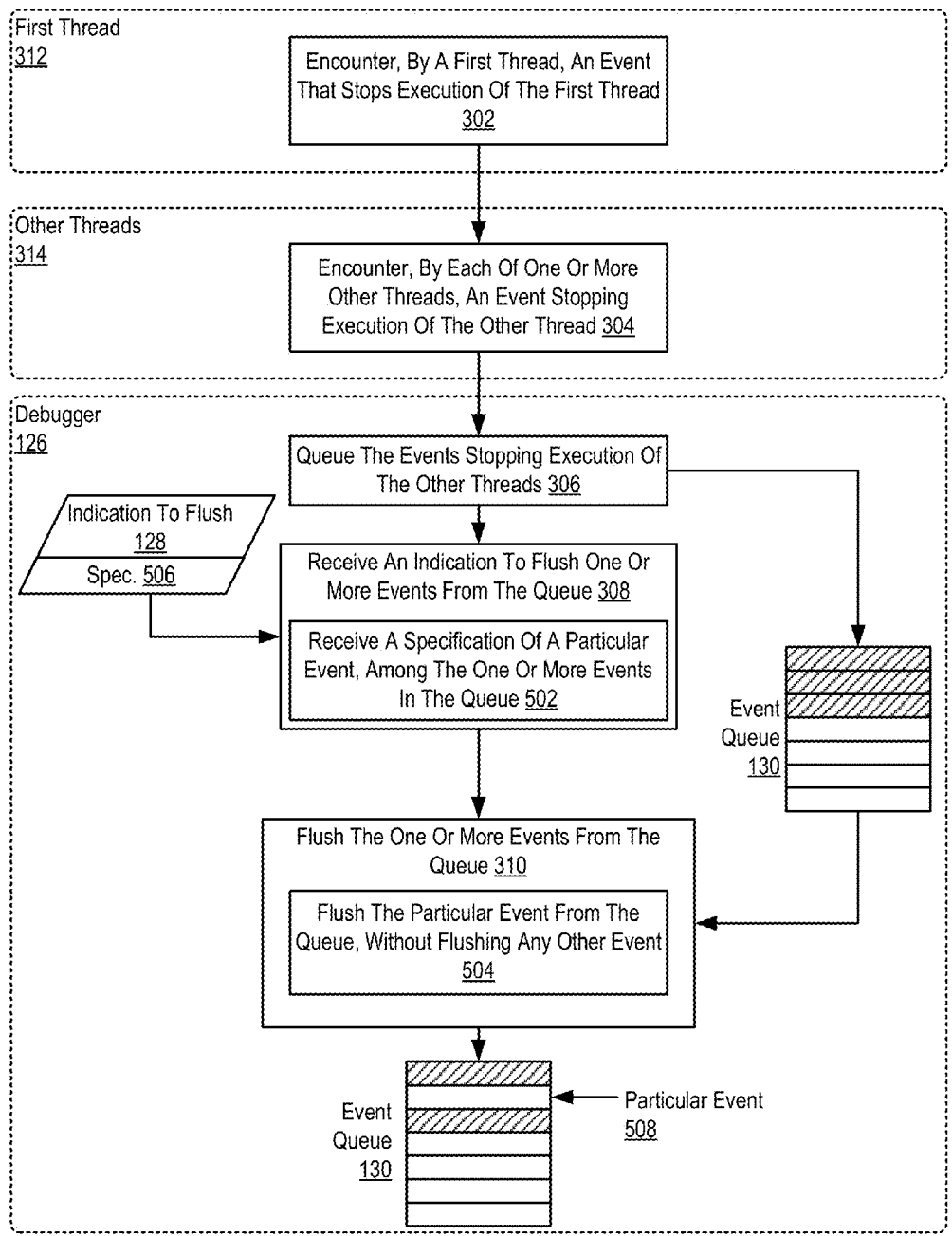
FIG. 5 sets forth a flow chart illustrating a further exemplary method for event management in a non-stop debugging environment according to embodiments of the present invention.

For further explanation, FIG. 5 sets forth a flow chart illustrating a further exemplary method for event management in a non-stop debugging environment according to embodiments of the present invention. The method of FIG. 5 is similar to the method of FIG. 3 in that the non-stop debugging environment of the method of FIG. 5 also includes a debugger (126) configured to debug a multi-threaded debuggee, where encountering an event by one of threads stops execution of only the one thread without concurrently stopping execution of other threads. The method of FIG. 5 is also similar to the method of FIG. 3 in that the method of FIG. 5 also includes: encountering (302), by a first thread (312), an event that stops execution of the first thread; while execution of the first thread (312) is stopped, encountering (304), by each of one or more other threads, an event stopping execution of the other thread; queuing (306), by the debugger (126), the events stopping execution of the other threads; receiving (308), by the debugger (126) from a user, an indication to flush one or more events from the queue (130); and flushing (310), by the debugger (126), the one or more events from the queue (130).

The method of FIG. 5 differs from the method of FIG. 3, however, in that in the method of FIG. 5, receiving (308) an indication (128) to flush one or more events from the queue includes receiving (502) a specification (506) of a particular event (508), among the one or more events in the queue, to flush and flushing (504) the one or more events from the queue includes flushing (504) the particular event (508) from the queue, without flushing any other event.

Receiving (502) a specification (506) of a particular event (508), among the one or more events in the queue, to flush may be carried out in various ways including, for example, by receiving such a specification (506) through one or more GUI elements, GUI objects, or GUI items, presented by a GUI to a user. Consider, as an example, the example GUI (124) of FIG. 2. In the data pane (204), a user is presented with a pop-up selection list (232) upon selection of a particular event in the event queue (130) displayed in the event queue tab (230). One of the options presented by the GUI (124) to the user in the pop-up selection list is an option to "Remove This Event From Queue." This option, once selected, causes the GUI to provide to the debugger a specification of the particular event to be flushed. The specification may, for example, include a thread identifier and event identifier.

The debugger may flush the particular event from the queue, by searching for queue (130) for an event having a thread identifier and event identifier provided by the user, via the GUI, in the specification (506) of the event to flush. Upon identifying the particular event (508) in the queue, the debugger (126) may remove the event and either resume execution of the thread that encountered the removed event or not. That is, the debugger may be configured to handle threads having flushed events in various ways.

Figure 6:
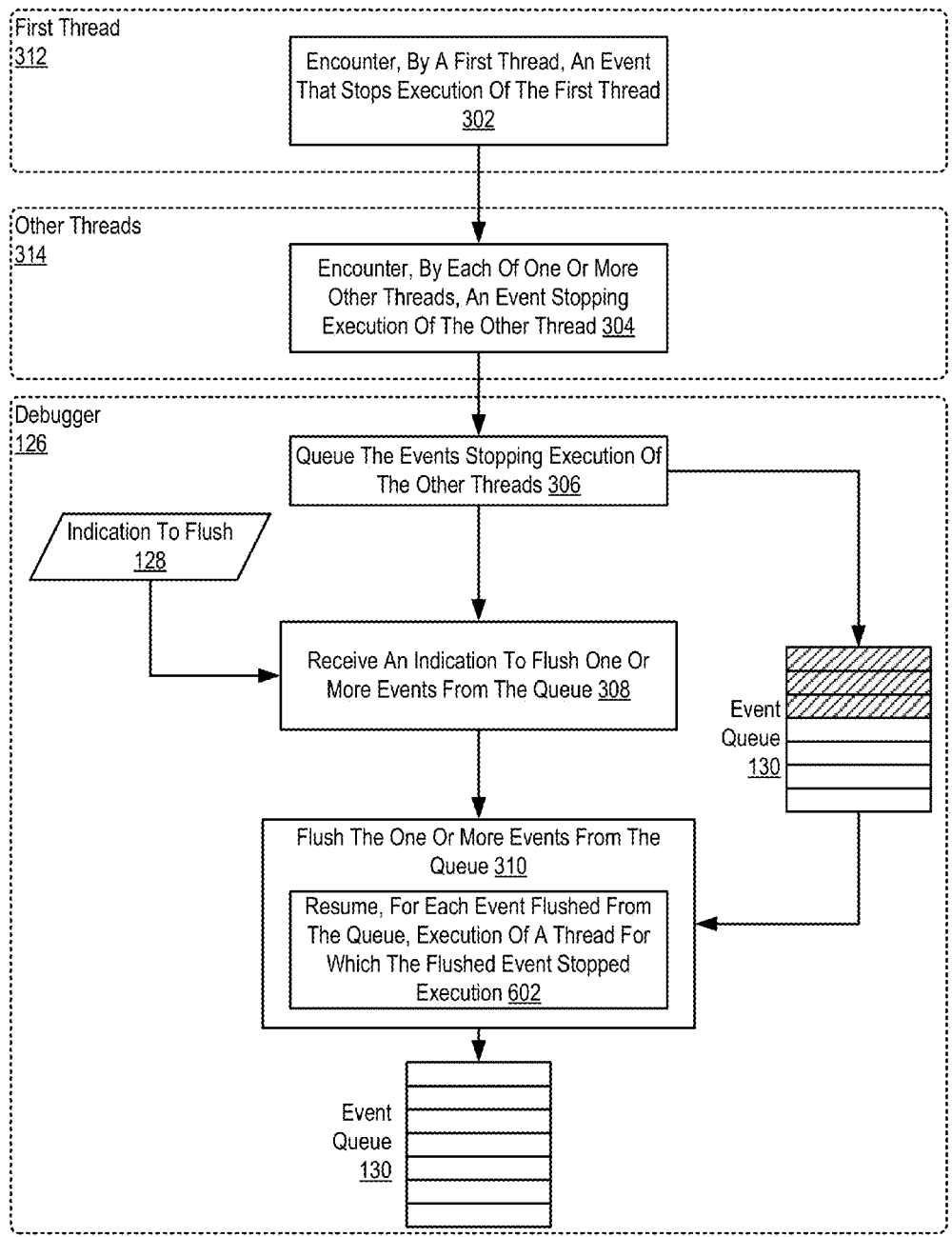
FIG. 6 sets forth a flow chart illustrating a further exemplary method for event management in a non-stop debugging environment according to embodiments of the present invention.

For further explanation, FIG. 6 sets forth a flow chart illustrating a further exemplary method for event management in a non-stop debugging environment according to embodiments of the present invention. The method of FIG. 6 is similar to the method of FIG. 3 in that the non-stop debugging environment of the method of FIG. 6 also includes a debugger (126) configured to debug a multi-threaded debuggee, where encountering an event by one of threads stops execution of only the one thread without concurrently stopping execution of other threads. The method of FIG. 6 is also similar to the method of FIG. 3 in that the method of FIG. 6 also includes: encountering (302), by a first thread (312), an event that stops execution of the first thread; while execution of the first thread (312) is stopped, encountering (304), by each of one or more other threads, an event stopping execution of the other thread; queuing (306), by the debugger (126), the events stopping execution of the other threads; receiving (308), by the debugger (126) from a user, an indication to flush one or more events from the queue (130); and flushing (310), by the debugger (126), the one or more events from the queue (130).

The method of FIG. 6 differs from the method of FIG. 3, however, in that in the method of FIG. 6, flushing (310) the one or more events from the queue (130) includes resuming (602), for each event flushed from the queue, execution of a thread for which the flushed event stopped execution. That is, in the method of FIG. 6, when an event is flushed, the thread corresponding to the flushed event (the thread that originally encountered the event) resumes executions at the behest of the debugger. Again, this provides an expediency to a user. A single flush of an event—possibly instigated by a single keystroke, a single keystroke combination, or a single mouse-click—also results in resumed execution of the thread that originally encountered the event. Consider, for further explanation, that in embodiments other than those depicted in the example of FIG. 6, the debugger may not concurrently flush an event and resume execution of the thread originally encountering an event. In these embodiments, the debugger may be configured to only resume execution of these threads (threads no longer having any events in the event queue) upon specific user requests.

Figure 7:
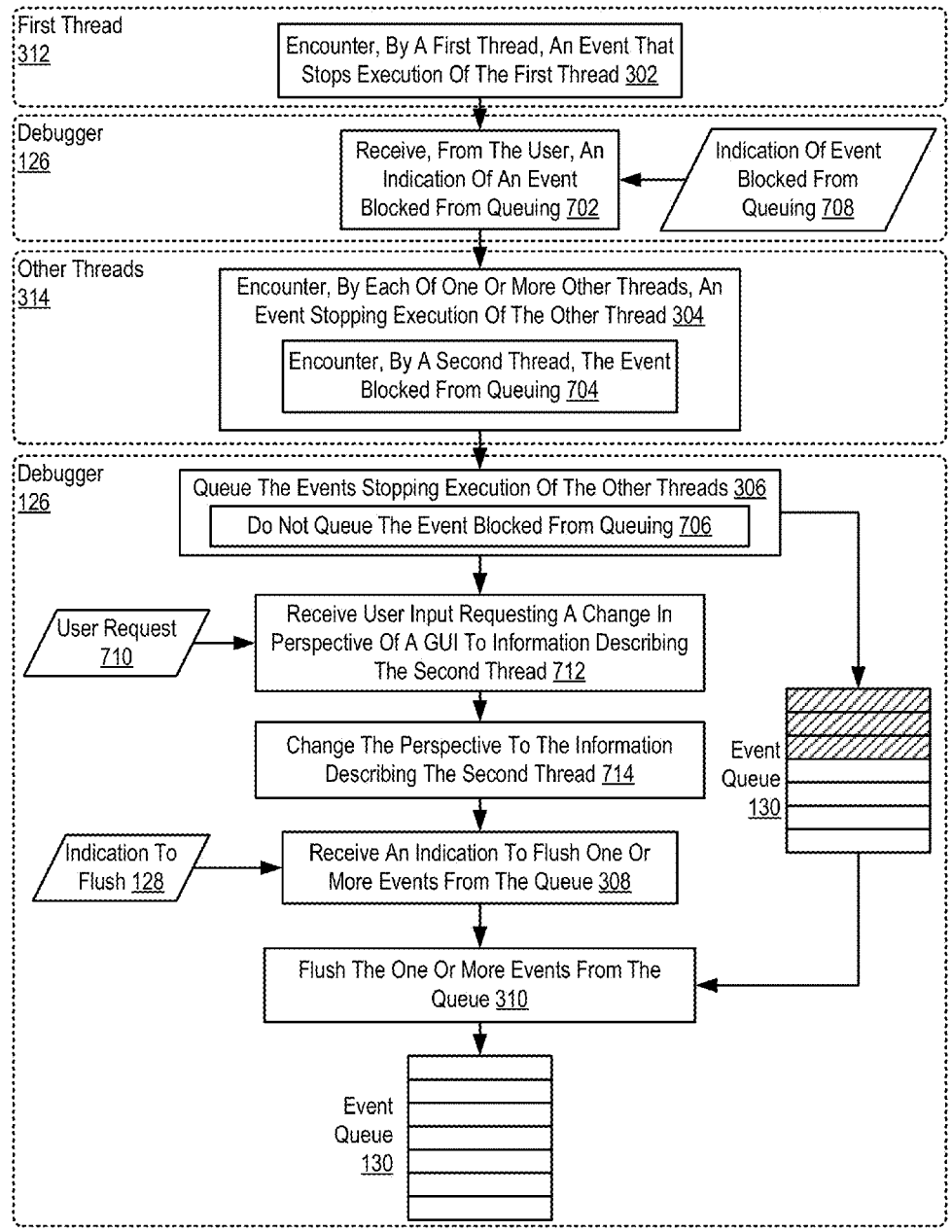
FIG. 7 sets forth a flow chart illustrating a further exemplary method for event management in a non-stop debugging environment according to embodiments of the present invention.

For further explanation, FIG. 7 sets forth a flow chart illustrating a further exemplary method for event management in a non-stop debugging environment according to embodiments of the present invention. The method of FIG. 7 is similar to the method of FIG. 3 in that the non-stop debugging environment of the method of FIG. 7 also includes a debugger (126) configured to debug a multi-threaded debuggee, where encountering an event by one of threads stops execution of only the one thread without concurrently stopping execution of other threads. The method of FIG. 7 is also similar to the method of FIG. 3 in that the method of FIG. 7 also includes: encountering (302), by a first thread (312), an event that stops execution of the first thread; while execution of the first thread (312) is stopped, encountering (304), by each of one or more other threads, an event stopping execution of the other thread; queuing (306), by the debugger (126), the events stopping execution of the other threads; receiving (308), by the debugger (126) from a user, an indication to flush one or more events from the queue (130); and flushing (310), by the debugger (126), the one or more events from the queue (130).

The method of FIG. 7 differs from the method of FIG. 3, however, in that the method of FIG. 7 includes receiving (702), by the debugger (126) from the user, an indication (708) of an event blocked from queuing. The debugger (126) may receive such an indication (708) of an event blocked from queuing through a user's interaction with a GUI. Consider, for example, the GUI (124) of FIG. 2. In the example GUI (124) of FIG. 2, an option in a pop-up selection list (232) is presented to the user to "Block Event From Queuing." Selection of this option causes the GUI (124) of FIG. 2 to provide to the debugger an indication of the event to be blocked from queuing.

In the method of FIG. 7, encountering (304), by each of one or more other threads, an event stopping execution of the other thread includes encountering (704), by a second thread, the event blocked from queuing. In the method of FIG. 7, the event encountered by the second thread—the event blocked from queuing—stops execution of the second thread.

In the method of FIG. 7, queuing (306), by the debugger (126), the events stopping execution of the other threads also includes not queuing (706) the event blocked from queuing. That is, all events encountered by the other threads are queued except when the event is the event blocked from queuing.

Blocking an event from queuing may be beneficial in various aspects of debugging including, for example, reducing a 'piling-up' on a particular event. Consider, for example, that the first thread encounters a breakpoint at line 11. Subsequently, ten other threads encounter the same breakpoint. Rather than queuing multiple encounters of the same event, the method of FIG. 7 enables a user to block queuing of the breakpoint at line 11 after the first thread encounters the breakpoint. Thereafter, other threads may encounter the breakpoint at line 11 and stop executing, but the event is not entered into the queue (130).

Although the blocked event is not queued (706) when the second thread encounters the blocked event, the second thread is stopped. The method of FIG. 7 enables a user to view information regarding the second thread, even when the second thread's encountered event is not queued. To that end, the method of FIG. 7 includes receiving (712), by the debugger (126), user input requesting (710) a change in perspective of a GUI presented by the debugger (126) to information describing the second thread stopped by the event blocked from queuing and changing (714), by the debugger (126), the perspective to the information describing the second thread.

In some embodiments, the debugger (126) may also be configured to remove any event blocks after resuming the first thread. In this way, after the first thread resumes, another thread encountering the breakpoint at line 11 will cause the event to be entered in the queue. Once entered into the queue, the user again has an option to block that event from being queued again—at least until execution of thread is resumed.

In view of the explanations set forth above, readers will recognize that the benefits of event management in a non-stop debugging environment according to embodiments of the present invention include:
  Reduced disruption of numerous GUI perspective changes occurring by flushing events from an event queue;
  User selectively in flushing queued events;
  Optimized flushing of events and resuming execution of all threads; and
  User selectively in blocking events from being queued.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable transmission medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable transmission medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable transmission medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method of event management in a non-stop debugging environment, the non-stop debugging environment comprising a debugger configured to debug a debuggee comprising a plurality of threads of execution, wherein encountering an event by one of threads stops execution of only the one thread without concurrently stopping execution of other threads, the method comprising:
    encountering, by a first thread, an event that stops execution of the first thread;
    while execution of the first thread is stopped, encountering, by each of one or more other threads, an event stopping execution of the other thread;
    queuing, by the debugger, the events stopping execution of the other threads;
    receiving, by the debugger from a user, an indication to flush one or more events from the queue;
    responsive to receiving the indication from the user to flush one or more events from the queue, flushing, by the debugger, the one or more events from the queue;
    receiving, by the debugger from the user, an indication of an event blocked from queuing, wherein:
    encountering, by each of one or more other threads, an event stopping execution of the other thread further comprises encountering, by a second thread, the event blocked from queuing, the event stopping execution of the second thread;
    queuing, by the debugger, the events stopping execution of the other threads further comprises not queuing the event blocked from queuing
    receiving, by the debugger, user input requesting a change in perspective of a graphical user interface ('GUI') presented by the debugger to information describing the second thread stopped by the event blocked from queuing; and changing, by the debugger, the perspective to the information describing the second thread.

2. The method of claim 1, wherein:

receiving an indication to flush one or more events from the queue further comprises receiving an indication to flush the entire queue upon resuming execution of the first thread; and flushing the one or more events from the queue further comprises flushing the entire queue and resuming execution of the first thread.

3. The method of claim 1, wherein:

receiving an indication to flush one or more events from the queue further comprises receiving a specification of a particular event, among the one or more events in the queue, to flush; and flushing the one or more events from the queue further comprises flushing the particular event from the queue, without flushing any other event.

4. The method of claim 1, wherein flushing the one or more events from the queue further comprises resuming, for each event flushed from the queue, execution of a thread for which the flushed event stopped execution.

* * * * *